United States Patent
Kray et al.

(10) Patent No.: US 8,662,834 B2
(45) Date of Patent: *Mar. 4, 2014

(54) METHOD FOR REDUCING TIP RUB LOADING

(75) Inventors: Nicholas Joseph Kray, Cincinnati, OH (US); David W. Crall, Loveland, OH (US); Daniel E. Mollmann, Cincinnati, OH (US); Donald Lee Gardner, West Chester, OH (US); Marcia Boyle Johnson, Lebanon, OH (US); Howard P. Weaver, Mason, OH (US); Max Robert Farson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 679 days.

This patent is subject to a terminal disclaimer.

(21) Appl. No.: 12/494,610

(22) Filed: Jun. 30, 2009

(65) Prior Publication Data

US 2010/0329863 A1 Dec. 30, 2010

(51) Int. Cl.
*F01D 11/12* (2006.01)

(52) U.S. Cl.
USPC ............................. 415/173.4; 416/228

(58) Field of Classification Search
USPC ........ 415/173.4, 174.4; 416/224, 228, 229 R, 416/236 R
See application file for complete search history.

(56) References Cited

U.S. PATENT DOCUMENTS

| | | | |
|---|---|---|---|
| 3,096,930 A | 7/1963 | Leonard | |
| 4,274,806 A * | 6/1981 | Gallardo, Jr. | 415/173.4 |
| 4,735,656 A | 4/1988 | Schaefer et al. | |
| 4,957,411 A * | 9/1990 | Girault | 415/173.4 |
| 5,040,436 A * | 8/1991 | Pfaltzgraff | 76/112 |
| 5,141,400 A | 8/1992 | Murphy et al. | |
| 5,275,531 A | 1/1994 | Roberts | |
| 5,456,576 A | 10/1995 | Lyon | |
| 5,476,363 A * | 12/1995 | Freling et al. | 415/173.1 |
| 5,603,603 A * | 2/1997 | Benoit et al. | 415/173.4 |
| 5,683,789 A | 11/1997 | Langenbrunner et al. | |
| 5,725,354 A | 3/1998 | Wadia et al. | |
| 5,785,498 A | 7/1998 | Quinn et al. | |

(Continued)

FOREIGN PATENT DOCUMENTS

| | | | |
|---|---|---|---|
| EP | 0291407 A1 | 11/1988 | |
| EP | 0292250 A1 | 11/1988 | |

(Continued)

OTHER PUBLICATIONS

International Search Report for corresponding PCT Application No. PCT/US2010/036996 dated Sep. 7, 2010.

*Primary Examiner* — Nathaniel Wiehe
*Assistant Examiner* — Ryan Ellis
(74) *Attorney, Agent, or Firm* — William Scott Andes; Gary M. Hartman; Domenica N. S. Hartman

(57) ABSTRACT

A method for reducing tip rub loads in a rotor blade is described having the steps of selecting a location of contact between the rotor blade and a static structure; selecting a location on the blade for incorporating a tip-cutter; selecting a cutter-profile for the tip-cutter; and incorporating the tip-cutter on the selected location on the blade such that tip-cutter is capable of removing a portion of the static structure during a tip rub such that tip rub loads are facilitated to be reduced.

21 Claims, 6 Drawing Sheets

(56) References Cited

U.S. PATENT DOCUMENTS

| | | |
|---|---|---|
| 6,832,890 B2 * | 12/2004 | Booth .................. 415/173.1 |
| 6,843,928 B2 * | 1/2005 | Cline et al. ................. 216/96 |
| 7,360,991 B2 | 4/2008 | Ford et al. |
| 7,374,403 B2 | 5/2008 | Decker et al. |
| 7,374,404 B2 | 5/2008 | Schilling |
| 7,476,086 B2 | 1/2009 | Wadia et al. |
| 2008/0159868 A1 | 7/2008 | Kray et al. |
| 2008/0159869 A1 | 7/2008 | Ruehr et al. |

FOREIGN PATENT DOCUMENTS

| | | |
|---|---|---|
| EP | 0666407 A2 | 8/1995 |
| EP | 1126133 A2 | 8/2001 |
| EP | 1302562 A1 | 4/2003 |
| EP | 1382799 A2 | 1/2004 |
| EP | 1391537 A1 | 2/2004 |
| EP | 1820938 A1 | 8/2007 |
| EP | 1930547 A2 | 6/2008 |
| GB | 2282856 A | 4/1995 |

* cited by examiner

METHOD FOR REDUCING TIP RUB LOADING

BACKGROUND OF THE INVENTION

This invention relates generally to gas turbine engines, and more specifically to methods and apparatus to reduce tip rub loads induced in rotor blades.

At least some known gas turbine engines typically include a casing, a fan rotor assembly, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

Some known fan and compressor assemblies include a casing that encloses a rotor having a plurality of rotor blades. Under certain engine operating conditions, the rotor blades may be subject to blade tip rub events that induce radial and tangential loads in the blade airfoils. Excessive rub loads may facilitate damage in the blade due to vibratory and fatigue conditions. Excessive rub loads from the blade rubs may also facilitate secondary damage that includes damage to non-adjacent blades and the casing. Excessive fan blade rubs may exert large rub loads on the rotating disks and bearings if the blade plows through the fan case abradable system.

Accordingly, it would be desirable to have a rotor and casing system comprising rotor blades having features to reduce the rub loads that are induced during blade tip rubs. It is desirable to have a rotor blade having an airfoil that machines away the casing abradable material during tip rubs. It is desirable to have a method of forming rotor assemblies having reduced blade tip rub loads.

BRIEF DESCRIPTION OF THE INVENTION

The above-mentioned need or needs may be met by exemplary embodiments which provide a method for reducing tip rub loads in an airfoil comprising the steps of selecting a location of contact between the airfoil and a static structure; selecting a location on the airfoil for incorporating a tip-cutter; selecting a cutter-profile for the tip-cutter; and incorporating the tip-cutter on the selected location on the airfoil such that tip-cutter is capable of removing a portion of the static structure during a tip rub such that tip rub loads are facilitated to be reduced.

In another aspect of the present invention, a method for reducing tip rub loads in an airfoil comprises providing a tip-grinder located on a tip portion, said tip-grinder capable of removing a portion of an abradable material during a tip rub.

In another aspect of the present invention, a method for reducing tip rub loads in an airfoil comprises providing a tip-rake located on at least a part of the tip portion, said tip-rake having a rake-profile that facilitates reducing loading induced to said airfoil during tip rubs.

In another aspect of the present invention, a method for assembling a rotor assembly comprises the steps of providing a blade assembly including an airfoil and a metal leading edge (MLE); removing material from a portion of the MLE to form a tip-cutter; and coupling the blade assembly to a rotor hub such that during tip rubs the tip-cutter machines an abradable material to facilitate reducing radial loading induced to the blade during tip rubs.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
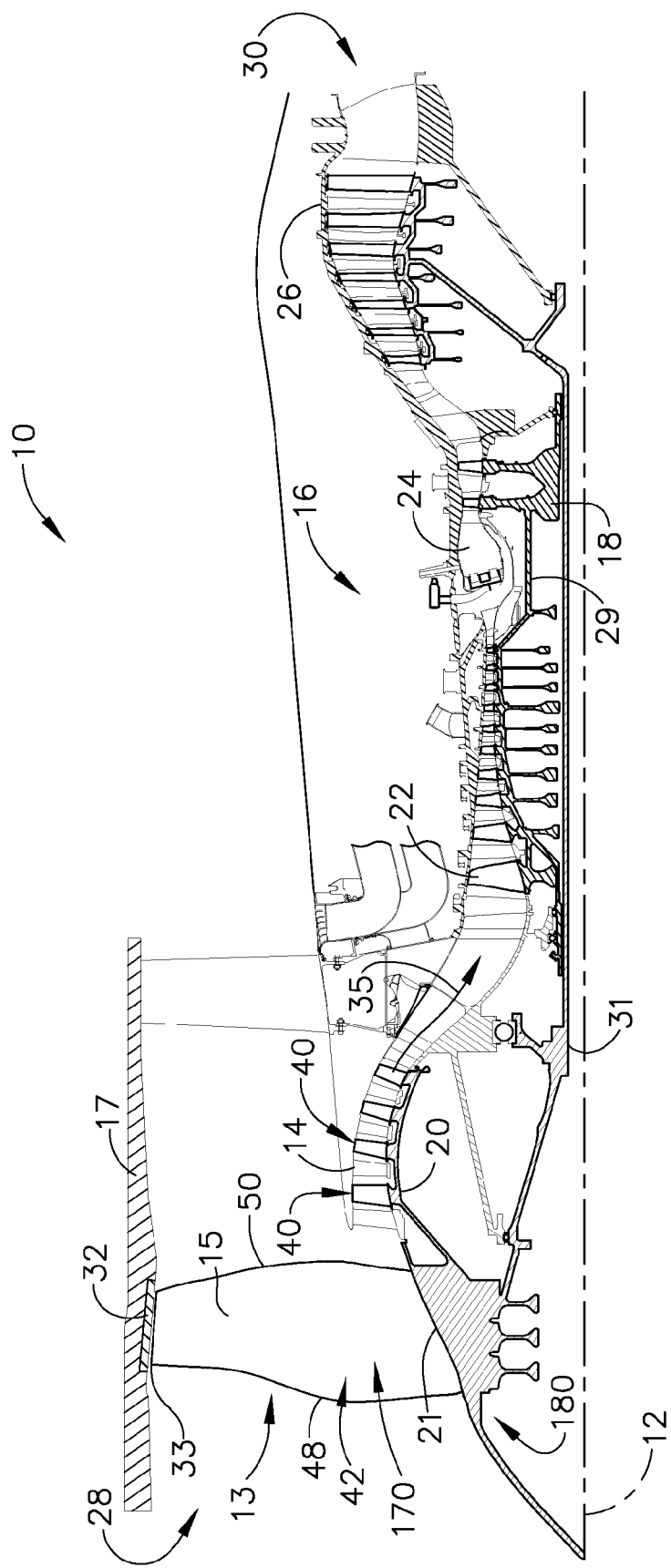
FIG. 1 is a diagrammatic view of an exemplary gas turbine engine comprising an airfoil according to an exemplary embodiment of the present invention.

FIG. 1 is a schematic illustration of an exemplary engine assembly 10 having an exemplary embodiment of the present invention of a rotor blade 15 having a tip portion 60 that facilitates reducing rub loads induced to the rotor blade 15 when a tip rub occurs between the blade tip and the casing 17. Engine assembly 10, having a longitudinal axis 12, comprises a fan assembly 13, a booster compressor 14, a core gas turbine engine 16, and a low-pressure turbine 26 that is coupled with fan assembly 13 and booster compressor 14. Core gas turbine engine 16 includes a high-pressure compressor 22, a combustor 24, and a high-pressure turbine 18. Booster compressor 14 includes a plurality of rotor blades 40 that extend substantially radially outward from a rotor disk 20 coupled to a first drive shaft 31. Engine assembly 10 has an intake side 28 and an exhaust side 30. Compressor 22 and high-pressure turbine 18 are coupled together by a second drive shaft 29.

During operation, air enters engine 10 through intake side 28 and flows through fan assembly 13 and compressed air is supplied from fan assembly 13 to booster compressor 14 and high pressure compressor 22. The plurality of rotor blades 40 compress the air and deliver the compressed air to core gas turbine engine 16. Airflow is further compressed by the high-pressure compressor 22 and is delivered to combustor 24. Hot gases from combustor 24 drive rotating turbines 18 and 26 and exit gas turbine engine 10 through exhaust side 30.

Figure 2:
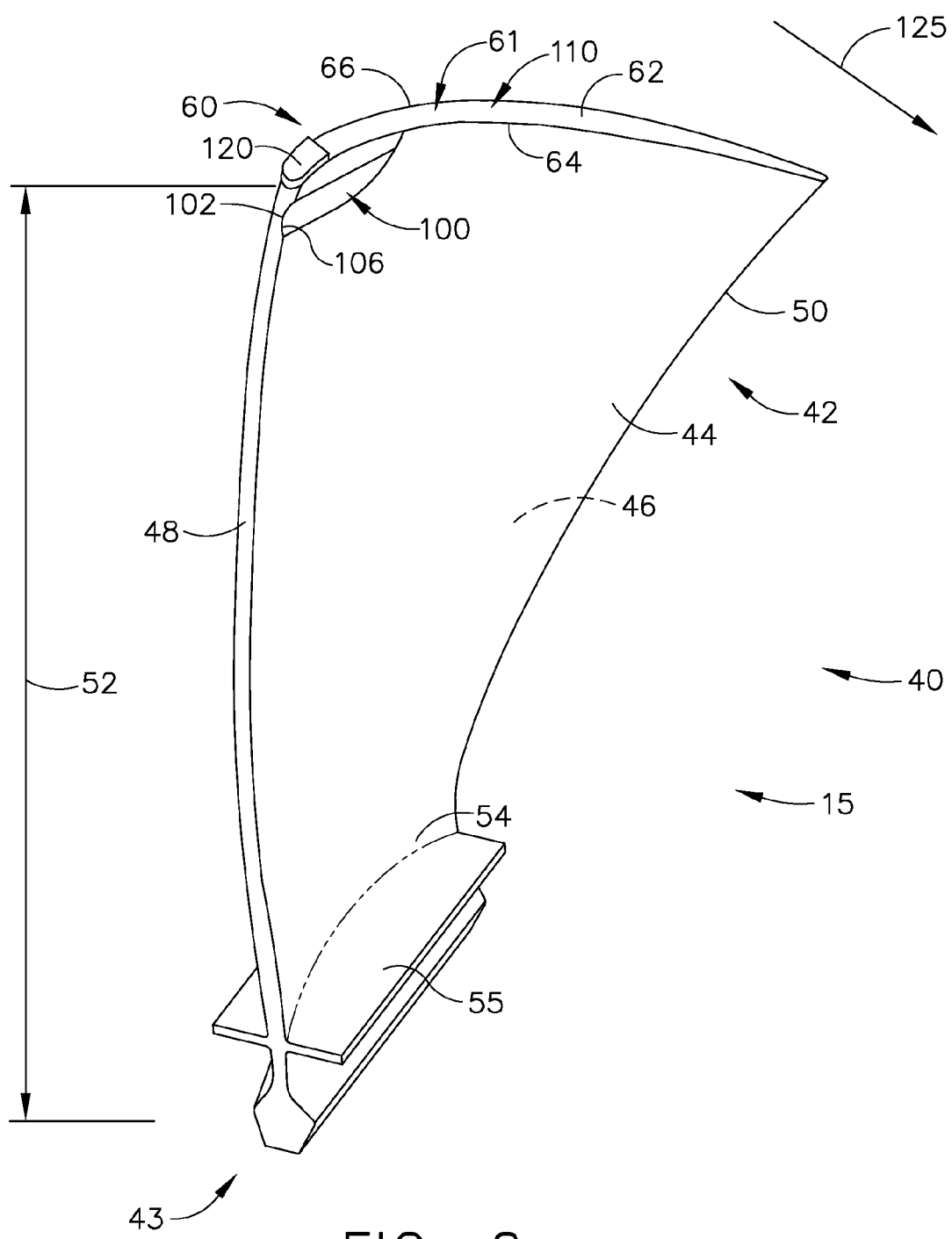
FIG. 2 is a perspective view of a rotor blade comprising an airfoil according to an exemplary embodiment of the present invention.

The present invention provides an exemplary apparatus and method for reducing rub loads induced in an airfoil, such as, for example, in a rotor blade 15 and rotor assembly 13 used in a gas turbine engine 10. FIG. 2 is a perspective view of a rotor blade 15 used in the fan or compressor section of the engine 10. In FIG. 1 the rotor blade shown as numeral item 15 is a fan rotor blade and rotor blade shown as numeral item 40 is a compressor section rotor blade. Although the present invention is described herein with respect to fan and compressor rotor blades, the present invention is not limited to such components, and applies to integrally bladed disks ("BLISKS") that have integral airfoils, and turbine rotors 18, 26. In the exemplary embodiment shown in FIG. 2, a rotor blade 15 is provided that includes an airfoil 42 having a first sidewall 44 (alternatively referred to herein as "Pressure Side" and "Concave Side"), a second sidewall 46 (alternatively referred to herein as "Suction Side" and "Convex Side"), a root portion 54 and a tip portion 60. Rotor blade 15 includes an airfoil 42, a platform portion 55, and an integral dovetail portion 43 that is used for mounting rotor blade 15 to rotor hub 21. Airfoil portion 42 includes a first sidewall 44 and a second sidewall 46. In the exemplary embodiment, first sidewall 44 is substantially concave and defines a pressure side of rotor blade 15, and second sidewall 46 is substantially convex and defines a suction side of rotor blade 15. Sidewalls 44 and 46 are joined together at a leading edge 48 and at an axially-spaced trailing edge 50. Trailing edge 50 is spaced chord-wise and downstream from leading edge 48. First and second sidewalls 44 and 46, respectively, each extend longitudinally or radially outward in a span 52 from the blade root portion 54 to a blade tip portion 60. Tip portion 60 is defined between sidewalls 44 and 46 and includes a tip surface 62, a concave edge 64, and a convex edge 66. Dovetail portion 43 includes a platform 55 positioned at root portion 54 and extending circumferentially outward from first and second sidewalls 44 and 46, respectively. In the exemplary embodiment, dovetail 43 is positioned substantially axially adjacent root portion 54. In an alternative embodiment, dovetail 43 may be positioned substantially circumferentially adjacent root portion 54. Rotor blades 15, 40 may have any conventional form, with or without dovetail 43 or platform 55. For example, the airfoil 42 of rotor blades 15, 40 may be formed integrally with a rotor hub 21 or disk (alternatively referred to herein as a blisk). In a blisk-type configuration, the rotor blades 15, 40 do not include dovetail 43 and platform 55.

Figure 4:
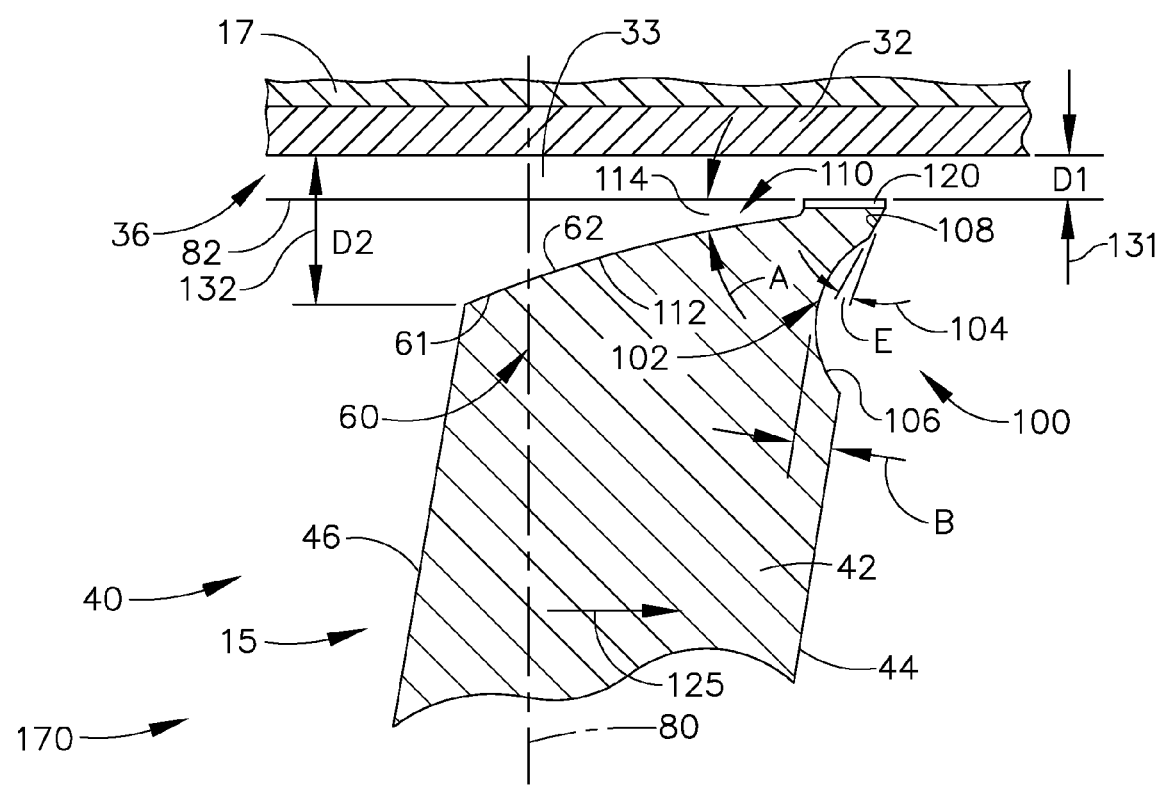
FIG. 4 is a cross-sectional illustration of the tip portion of the airfoil shown in FIG. 2 positioned within the casing of the gas turbine engine shown in FIG. 1.

In the exemplary embodiment shown in FIG. 1 and FIG. 4, an abradable material 32 is coupled to a casing 17 that extends circumferentially around a longitudinal axis 12. Platforms 55 of rotor blades 40 define an inner boundary of a flow-path 35 extending through booster compressor 14. In an alternative embodiment, such as, for example, a blisk 180, the inner boundary may be defined by a rotor disk 21 (shown in FIG. 1). The casing 17 and abradable material 32 define a radially outer boundary of the flow-path 35. As shown in FIG. 4, abradable material 32 is spaced a distance D1 and D2 from each rotor blade tip portion 60 such that a clearance gap 33 is defined between material 32 and airfoil 42. Specifically abradable material 32 is spaced a distance D2 from convex edge 66 and a distance D1 from concave edge 64. Distances D1 and D2 are selected to facilitate preventing tip rubs between rotor blades 15, 40 and abradable material 32 during engine operation. In the exemplary embodiment, the inner and outer boundaries of flow-path are not parallel and stacking axis 80 is not required to be perpendicular to outer flow path boundary.

During normal engine operations, rotor disk 20 (and rotor hub 21) rotates within an orbiting diameter that is substantially centered about longitudinal axis 12. Accordingly, rotor blades 15, 40 rotate about longitudinal axis 12 such that clearance gap 33 (see FIG. 4) is substantially maintained and, more specifically, such that tip portion 60 remains a distance D1 from abradable material 32, with the exception of minor variations due to small engine 10 imbalances. Clearance gap 33 is also sized to facilitate reducing an amount of air i.e., tip spillage, that may be channeled past tip portion 60 during engine operation.

Under some transient engine operating conditions, blades 15 may deflect such that tip portion 60 may rub abradable material 32. During such tip rubs, in conventional blades, some portions of the airfoil tip may be jammed into abradable material 32, such that radial and axial loads are induced to rotor blades. Frequent tip rubs of this kind may increase the radial loads and blade vibrations. Such loading and vibratory stresses may increase and perpetuate the dynamic stresses of conventional airfoils, which may subject the conventional blades to material fatigue. Over time, continued operation with material fatigue may cause blade cracking and/or shorten the useful life of the rotor blades.

Figure 3:
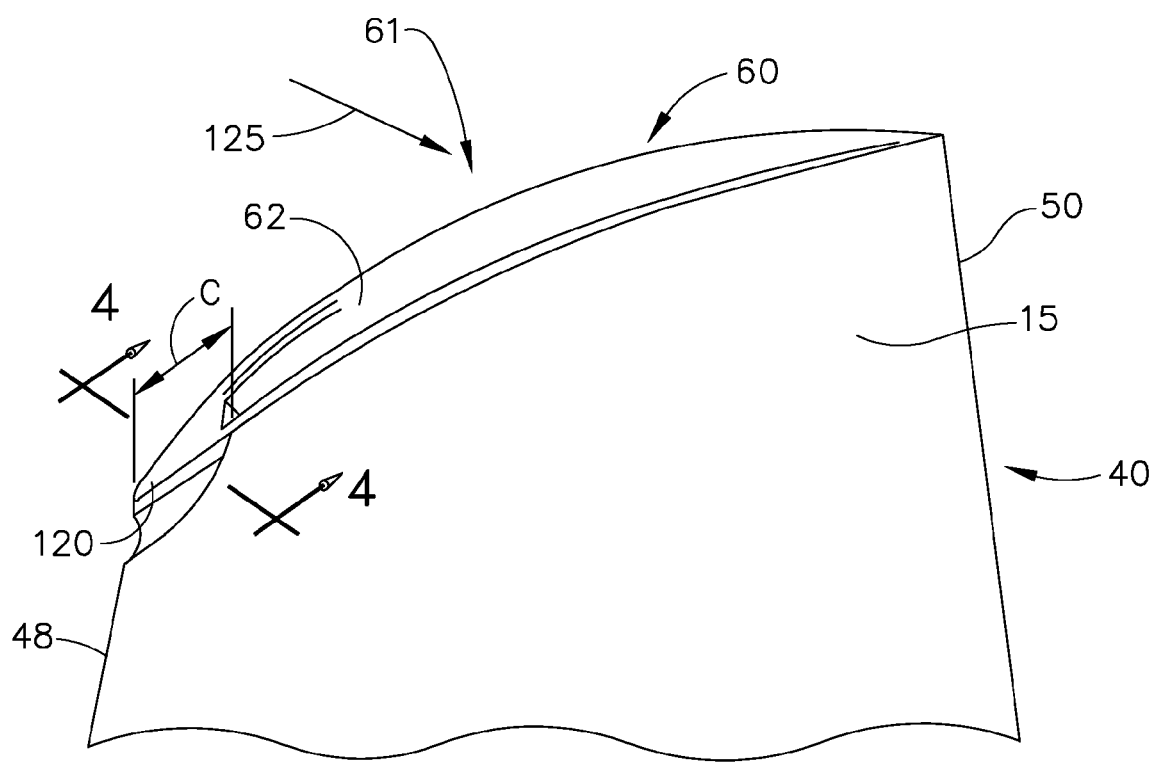
FIG. 3 is a perspective view of the tip portion of the airfoil shown in FIG. 2.

FIG. 2 illustrates an exemplary fan rotor blade 15 according to one embodiment of the present invention. FIG. 3 is a perspective view of the tip portion of the airfoil 42 of the rotor blade 15. FIG. 4 is a cross-sectional illustration of the tip portion of the airfoil 42 of the rotor blade shown in FIG. 2 positioned within the casing 17 of the gas turbine engine 10 shown in FIG. 1. Specifically, in the exemplary embodiment shown in FIGS. 2-4, rotor blade 15 has a tip portion 60 that facilitates reducing radial loading induced to blade 15 if tip rubs occur during engine operation.

In the exemplary embodiments of the present invention shown in FIGS. 1-5 herein, certain features are provided near the airfoil tip 61 and leading edge 48 regions that facilitate reducing the rub loads that are generated when airfoil tip rubs against the abradable material 32 under certain operating conditions. Specifically, these features reduce the rub loads by removing a portion of the abradable material 32 by machining. One such feature, shown in the exemplary embodiments herein (See FIG. 2), is a tip-cutter 100 that is located near the tip portion 60. In the exemplary embodiment shown in FIG. 2, the tip-cutter 100 is located near the leading edge 48 near the tip 61, on the "pressure side" (first sidewall 44) of the airfoil 42. The tip-cutter 100 has a cutter-profile 102 having geometric features (See FIG. 4) that are capable of removing a portion of the abradable material 32 by machining during a tip rub. The exemplary cutter-profile 102, shown in FIG. 4, comprises a cutter-angle 104 located at the leading edge 48 at the airfoil tip 61. The cutter-angle 104 is an angle between the leading edge 48 and a flat portion 108 at the blade tip 61, as shown in FIG. 4. The cutter-angle 104 is selected such that it promotes the machining and removal of the abradable material 32 during a tip rub event. The cutter-angle 104 may have a value between about 1 degree and 10 degrees. In a preferred embodiment, the cutter-angle 104 has a value between about 2 degrees and about 5 degrees. The cutter-profile 102 shown in FIG. 4 further comprises an arcuate recess 106 that extends into the airfoil to a certain depth "B" (See FIG. 4). In a preferred embodiment, the depth "B" has a value of about 0.005 inches. In other embodiments, the depth "B" may have a value of up to about 0.050 inches. The cutter profile 102 near the tip 61 extends in a span-wise direction along a portion of the leading edge 48, as shown in FIG. 2. The cutter profile 102 also extends in a chordwise direction along a portion of the airfoil 42 from the leading edge 48 towards the trailing edge 50 such that the depth "B" and the cutter-angle 108 gradually reduce to zero so as to blend smoothly with the airfoil concave side 44 to promote smooth airflow in the airfoil 42.

In another exemplary embodiment of the present invention, the airfoil 42 has a tip-grinder 120 located on the tip portion 60, such as, for example, near the leading edge 48, as shown in FIG. 2. The tip-grinder 120 comprises an abrasive material applied to the airfoil tip that serves as a cutting agent for an abradable material 32 located in the casing 17. The tip-grinder abradable material may be regular or irregular in shape and may have sharp edges that are less than 0.010 inches in radius. The tip-grinder 120 is made from a suitable material that is capable of removing a portion of an abradable material 32 during a tip rub. The tip-grinder 120 is made from a ceramic, metallic or intermetallic material having a composition comprising of embedded abrasive material. In the case of metallic and intermetallic particles the hardness of the material would be in excess of Vickers 750 (g/mm^2). Known abrasive materials may be used in the tip-grinder 120. Preferred known abrasive materials used for the tip-grinder 120 include Aluminum Oxide, Silicon Carbide, CBN or Diamond. The tip-grinder 120 may be bonded to the airfoil 42 using known methods such as brazing and welding. In a preferred embodiment, the tip-grinder 120 is bonded to the airfoil 42 by brazing. In alternative embodiments of the blade 15, the tip-grinder 120 may be bonded or applied to the airfoil 42 by thermal spray or using a known bonding adhesive. Although the tip-grinder 120 is shown in FIG. 4 as being located near the leading edge 48 tip, in alternative embodiments, the tip-grinder 120 may be located at the blade tip near trailing edge 50, or other suitable locations on the tip 61.

In another aspect, the present invention comprises a tip-rake 110 (See FIG. 4) extending between the first and second sidewalls 44, 46, located on at least a part of the tip portion 60. The tip-rake 110 has a rake-profile 112 that facilitates reducing loading induced to the airfoil 42 during tip rubs. In the exemplary embodiment shown in FIG. 4, the rake-profile 112 has a rake angle 114 ("A") with respect to a plane 82 that is substantially perpendicular to a stacking axis 80 of the airfoil 42. The stacking axis 80 is an axis that extends through blade 15 in a span-wise In the exemplary embodiments shown in FIGS. 2-5, tip surface 62 extends obliquely between airfoil sidewalls 44 and 46. More specifically, tip surface 62 is oriented at a rake angle A. Rake angle A of tip surface 62 is measured with respect to a plane 82 extending through rotor blade 15 substantially perpendicular to stacking axis 80. Plane 82 facilitates the fabrication and orientation of tip surface 162. In one embodiment, during a fabrication process, plane 82 is established using a plurality of datum points defined on an external surface of blade 15. Alternatively, blade tip surface 62 may be oriented at any rake angle A that enables blade 15 to function as described herein.

In the exemplary embodiment, the tip surface 62 has a rake-profile 112 defined by rake angle A. The orientation of the rake tip surface 62 as defined by the rake-profile 112 causes the clearance gap 33 to be non-uniform across blade tip portion 60. Specifically, in the exemplary embodiment, because tip surface 62 is oriented at rake angle A, a height D2 of clearance gap 33 at convex edge 66 (see FIGS. 2 and 4) is greater than a height D1 of clearance gap 33 at concave edge 64 (see FIGS. 2 and 4). In the exemplary embodiment, surface 62 having a rake-profile 112 is formed via a raking process. Alternatively, surface 62 may be flat having a substantially constant rake angle A using any other known fabricating process, including but not limited to, a machining process.

In another exemplary embodiment of the present invention, a conventional blade may be modified to create the blade 15 to include tip portion 60 as described herein. Specifically, a tip-cutter 100 is formed by machining, or other known methods, near the tip of a blade as described herein. Further, optionally, a tip-grinder 120 is coupled to an existing blade as described herein and shown in FIGS. 2-5. Additionally and optionally, excess blade material from an existing blade tip portion 60 is removed via a raking process to form tip portion 60 with a corresponding rake-profile 112 and rake angle A that facilitates prevention of convex edge 66 contact with abradable material 32 during a tip rub. The rake angle A may have a value between about 5 degrees and about 15 degrees. More specifically, in a preferred embodiment, the rake angle A has a value between about 3 degrees and about 5 degrees. In alternative embodiments, blade 15 is formed with tip portion 60 having rake-profile 112 and rake angle A, and tip-cutter 100 via a known processes, such that tip portion 60 is formed with a desired rake-profile 112, and cutter-profile 102, and optionally, tip-grinder 112 is added at the tip 61.

During normal engine operations, the rotor disk 20 rotates within an orbiting diameter that is substantially centered about longitudinal axis 12. Accordingly, rotor blades 15, 40 rotate about longitudinal axis 12, and a sufficient clearance gap 33 is maintained between rotor blade tip portion 60 and abradable material 32. In the event blade 15 or 40 is deflected, tip portion 60 may inadvertently rub abradable material 32. As shown in FIGS. 2 and 4, because tip portion 60 is oriented at rake angle A, during a tip rub, concave edge 64 is closer to the abradable material 32, rather than convex edge 66. The tip-grinder 120, if present, first contacts the abradable material 32 and machines away a portion of the abradable material 32. The tip-cutter 100 is at the leading end of the blade 15 in the rotational direction 125 and machines away a portion of the abradable material 32 during a tip rub event. The cutter-profile 102 is such that the cutter-angle 104 makes contact with the abradable material 32 at an angle to machine it, and arcuate recess 106 removes the machined abradable material 32 away from the tip 61. As a result, during tip rubs, radial and axial loads induced to rotor blade 15 are facilitated to be reduced in comparison to conventional rotor blades. Moreover, dynamic stresses induced to blade 15, which may result in blade cracking in conventional blades due to material fatigue, are also facilitated to be reduced. Specifically, loading and vibratory stresses induced to blade 15 are reduced because the abradable material 32 is machined away during tip rubs, rather than being jammed against the casing 17 as conventional blades do.

Figure 5:
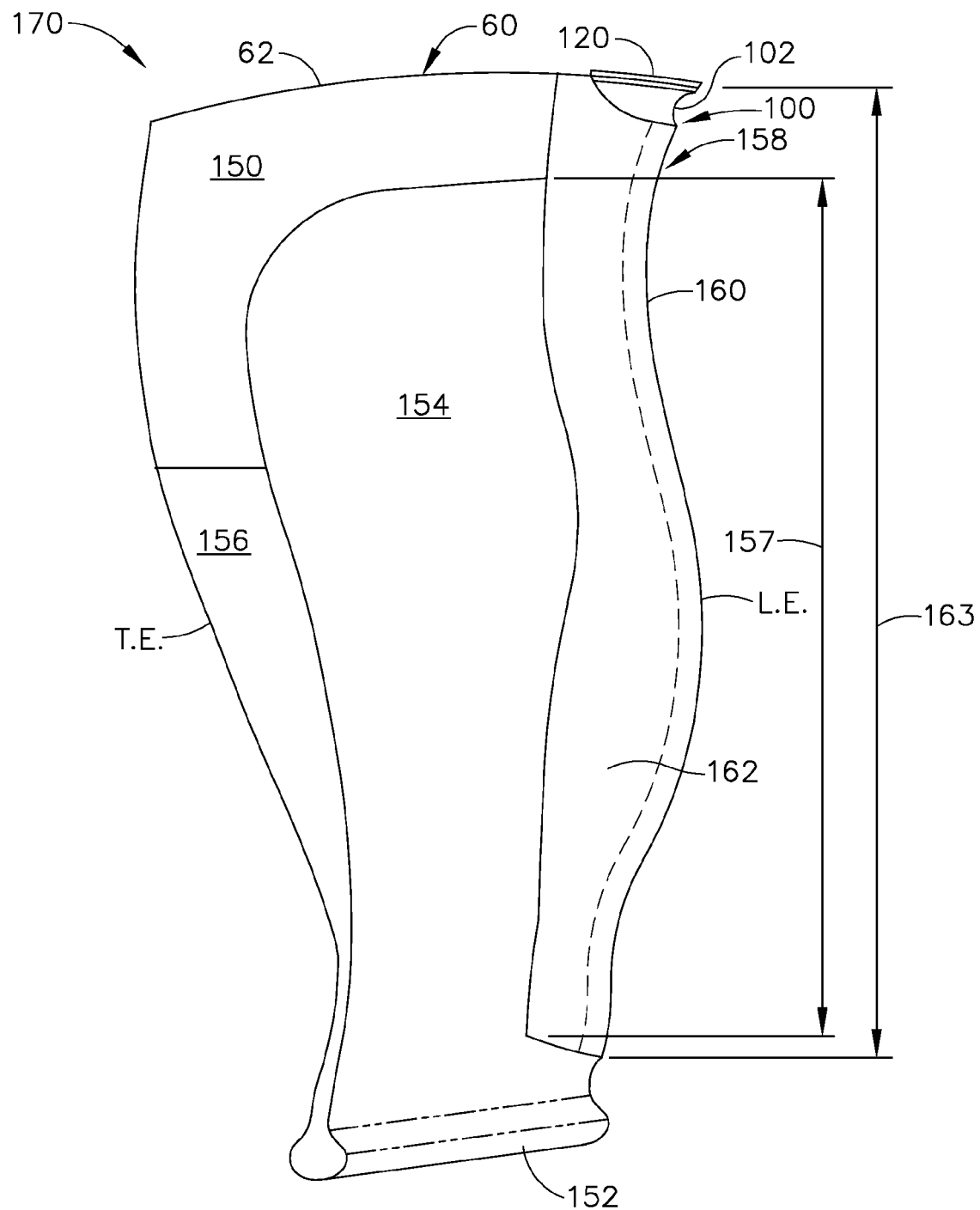
FIG. 5 is a schematic view of an exemplary rotor blade according to an alternative embodiment of the present invention.

FIG. 5 shows a schematic view of an alternative exemplary embodiment of the present invention of a blade 170 having features to reduce tip rub loads as described before. The exemplary blade 170 shown in FIG. 5 is a fan blade that may be used with gas turbine engine 10 (shown in FIG. 1). The fan blade 170 includes an airfoil 154, a blade tip cap 150 that cooperates with a radially innermost surface (not shown) of casing 17 to form clearance 33 (shown in FIG. 1) therebetween. In the alternative exemplary embodiment shown in FIG. 5, cap 150 is formed from titanium sheet metal. Alternatively, cap 150 is formed from any material that facilitates operation of blade 170 as described herein. Blade 170 also includes a dovetail root portion 152 that facilitates coupling to a rotor hub 21. The airfoil 154 of blade 170 is formed from materials via processes that are both known in the art. Such materials include, but are not limited to, composites. Blade 170 also includes a trailing edge guard 156. In the exemplary embodiment, guard 156 is formed from titanium sheet metal. Alternatively, guard 156 is formed from any material that facilitates operation of blade 170 in the engine 10. Airfoil 154 has a first radial length 157.

Blade 170 further includes a metal leading edge (MLE) 158. MLE 158 is formed from any metallic material that facilitates operation of fan rotor assembly 13 in the engine 10, including, but not being limited to, titanium alloys and inconel alloys. MLE 158, as well as cap 150 and guard 156, are coupled to airfoil 154 via methods known in the art, wherein such methods include, but are not limited to, brazing, welding, and adhesive bonding. MLE 158 includes a solid nose region 160 and a plurality of sidewalls 162 (only one facing sidewall 162 shown in FIG. 5). MLE 158 extends along substantially all of airfoil radial length 157. Moreover, a radially innermost portion of MLE 158 extends radially inward to root portion 152 and a radially outermost portion of MLE 158 extends radially outward such that MLE 158 is substantially flush with cap 150. Therefore, in the exemplary embodiment, MLE 158 is configured with a second radial length 163 that is greater than first radial length 157. Alternatively, length 163 is any value that facilitates operation of blade 170 during tip rub events as described previously herein.

When assembled in engine 10, the blade 170 and casing 37 cooperate to form clearance 33 therebetween. As described previously herein, under certain engine operating conditions, rotor blade 170 tip 61 may contact the abradable material 32 that surrounds the blade tips (See FIGS. 1 and 4). For example, unbalanced conditions within engine 10 (shown in FIG. 1) may facilitate a decrease in a radial distance between tip cap 150 and casing 17 thereby increasing a probability of contact, or rub, between cap 150 and the abradable material 32 in the casing 17. Such rubbing will induce radial and tangential forces, wherein a least a portion of such loads will be transferred into casing 17 and a portion into airfoil 154. The alternative exemplary embodiment of blade 170 shown in FIG. 5 has features located in the blade tip portion 60 that reduce the tip rub loads as described previously herein. The blade 170 has a tip-cutter 100 (described previously herein) located at the tip portion 60 of the blade leading edge solid nose region 160. The tip-cutter 100 has a cutter-profile 102 having a flat portion 108, cutter-angle 104 and an arcuate recess 106 as described previously herein. The tip-cutter 100 is configured such that, during tip rub events, it makes contact with the abradable material 32 at an angle and machines away the abradable material 32 resulting in reduced rub loads. The cutter-profile 102 recess 106 is such that the abradable material 32 that is machined is removed away from the contact region. The cutter-angle 104 may have a value between about 1 degree and about 10 degrees. In a preferred embodiment, the cutter-angle 104 has a value between about 2 degrees and about 5 degrees.

The blade 170 may further comprise a tip-grinder 120 located at the blade tip portion 60, as described previously. In FIG. 5, the tip-grinder 120 is shown located at the tip portion 60 of the blade leading edge solid nose region 160. Alternatively, the tip-grinder 120 may be located at other suitable locations in the tip portion 60 of blade tip cap 150. The tip-grinder 120 is made from a suitable material that is capable of removing a portion of an abradable material 32 during a tip rub. The tip-grinder 120 comprises an abrasive material that serves as a cutting agent for an abradable material 32 located in the casing 17. The tip-grinder abradable material may be regular or irregular in shape and may have sharp edges that are less than 0.010 inches in radius. The tip-grinder 120 is made from a ceramic, metallic or intermetallic material having a composition comprising of embedded abrasive material. In the case of metallic and intermetallic particles the hardness of the material would be in excess of Vickers 750 (g/mm^2). Known abrasive materials may be used in the tip-grinder 120. Preferred known abrasive materials used for the tip-grinder 120 include Aluminum Oxide, Silicon Carbide, CBN or Diamond. The tip-grinder 120 may be bonded to the MLE 158 or tip cap 150 using known methods such as brazing and welding. In a preferred embodiment, the tip-grinder 120 is bonded to the MLE 158 by brazing. In alternative embodiments of the blade 15, the tip-grinder 120 may be bonded or applied to the MLE 158 and/or tip cap 150 by thermal spray or using a known bonding adhesive.

In another aspect, blade 170 shown in FIG. 5 may further comprise a tip-rake 110 (See FIG. 4 for example) extending between the first and second sidewalls 44, 46, located on at least a part of the tip portion 60 of the tip cap 150. The tip-rake 110 has a rake-profile 112 that facilitates reducing loading induced to the airfoil 42 during tip rubs. As described previously herein (see FIG. 4 for example), the rake-profile 112 has a rake angle 114 ("A") such that during tip rub event, contact between the blade tip 61 and abradable material 32 occurs at the concave edge of the blade tip to reduce rub loads. The tip-rake 110 may have a rake angle 114 between about 2 degrees and about 15 degrees. In a preferred embodiment, the tip-rake 110 has a rake angle 114 between about 3 degrees and about 5 degrees.

Figure 6:
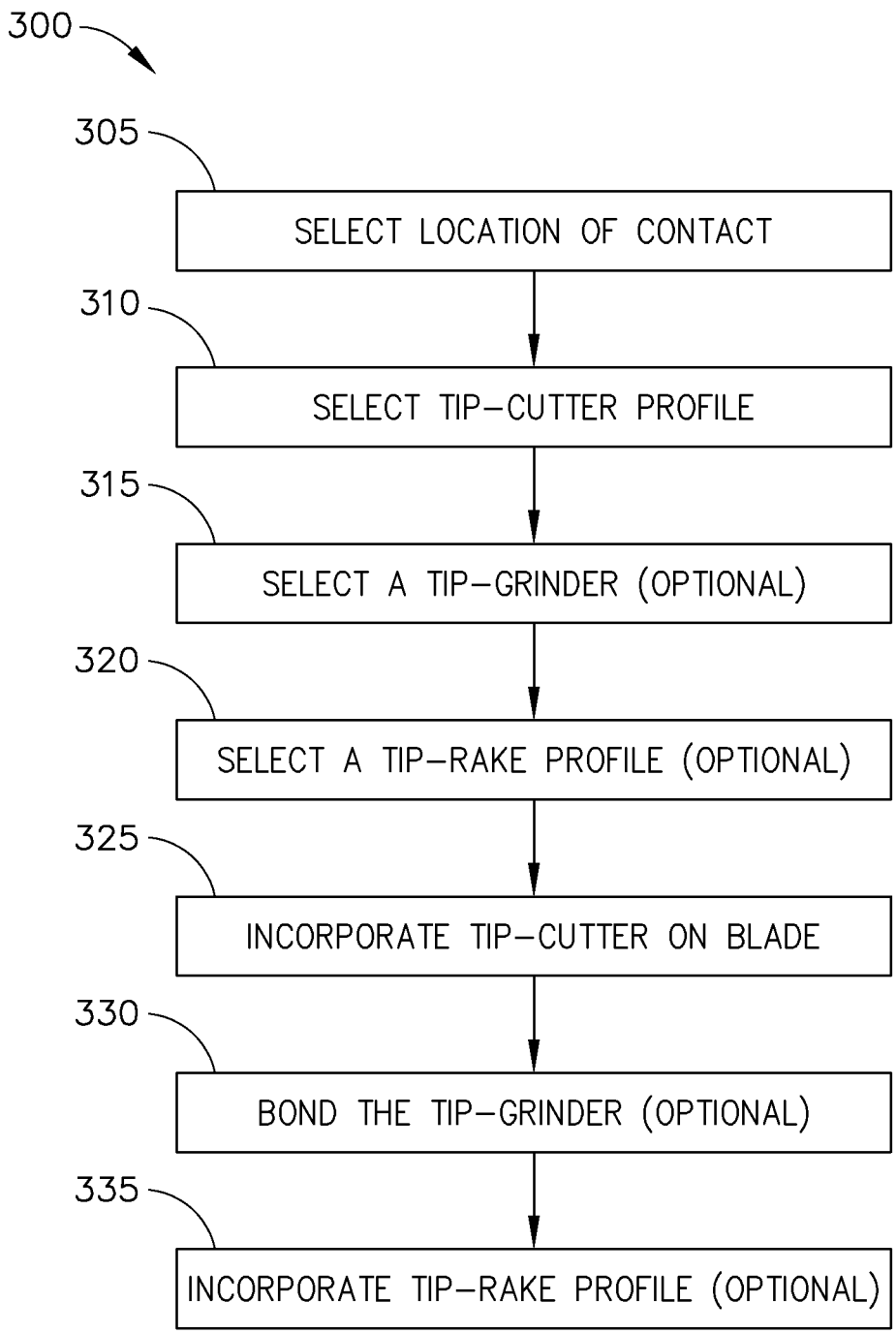
FIG. 6 is a flow chart showing the steps of a method of reducing tip rub loading.

FIG. 6 is a flow chart showing the steps of a method 300 of reducing tip rub loading. The method 300 comprises the step 305 of selecting a location of contact during a tip rub event between the tip of the blade and a static structure, such as the abradable material 32. This is illustrated in FIG. 4, for example, wherein the location of contact is chosen as the pressure side 44 leading edge tip. Step 310 comprises selecting cutter-profile 102 (described previously herein) for the tip-cutter 100. Step 315 comprises the optional step of selecting a tip-grinder 120. Suitable materials capable of machining the abradable 32 can be chosen, as described previously. Step 320 comprises the optional step of selecting a tip rake-profile, also described previously herein. Step 325 comprises incorporating the tip-cutter 100 on the blade tip. Preferably, this is done by machining, although other known methods may be used. Step 330 comprises the optional step of bonding the tip-grinder 120 (if opted in step 315) as described previously. Step 335 comprises the optional step of incorporating the tip-rake 110 rake-profile 112 on the blade (if opted in step 320).

Exemplary embodiments of rotor blades are described above in detail. The rotor blades are not limited to the specific embodiments described herein, but rather, components of each assembly may be utilized independently and separately from other components described herein. For example, each rotor blade component can also be used in combination with other blade system components, including, but not limited to, blisks, and with other gas and non-gas turbine engines. Although the present invention described herein is described in connection with the turbine engine shown in FIG. 1, it should be apparent to those skilled in the art and guided by the teachings herein provided that with appropriate modification, the apparatus and method of the present invention can also be suitable for any engine with compressors capable of operating as described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reducing tip rub loads in an airfoil comprising the steps of:
   selecting a location of contact between the airfoil and a static structure to include at least part of a tip portion of the airfoil;
   selecting a location on the airfoil for incorporating a tip-cutter, the location including a leading edge of the airfoil that is separated from a trailing edge of the airfoil in a chord-wise direction of the airfoil;
   selecting a tip-cutter profile for the tip-cutter; and
   incorporating the tip-cutter on the selected location on the airfoil such that the tip-cutter profile comprises an arcuate portion on the leading edge and a flat portion on the leading edge between the arcuate portion and the tip portion of the airfoil, the arcuate portion defining a recess in the leading edge that extends in the chord-wise direction toward the trailing edge of the airfoil, the flat portion defining a cutter-angle with the leading edge that extends in the chord-wise direction toward the trailing edge of the airfoil, wherein the tip-cutter is capable of removing a portion of the static structure during a tip rub such that tip rub loads are facilitated to be reduced.

2. A method according to claim 1 wherein the static structure is an abradable material.

3. A method according to claim 1 wherein the incorporating step comprises forming the cutter-angle to be an angle of two to five degrees.

4. A method according to claim 1 wherein the incorporating step comprises forming the arcuate and flat portions to be contiguous with each other.

5. A method according to claim 1 wherein the incorporating step comprises forming the recess of the arcuate portion to extend into the airfoil to a depth of up to 0.050 inch.

6. A method according to claim 1 wherein the step of incorporating the tip-cutter comprises machining the tip-cutter profile on the leading edge of the airfoil.

7. A method according to claim 1 further comprising the step of selecting a tip-grinder.

8. A method according to claim 7 further comprising bonding the tip-grinder to the airfoil.

9. A method according to claim 8 wherein the bonding step comprises brazing.

10. A method according to claim 1 further comprising forming the airfoil to have a concave edge and a convex edge that are separated from each other at the tip portion, and forming the tip portion to have a tip-rake profile so that the concave edge is closer to the static structure than the convex edge during a tip rub to facilitate reducing loading induced to the airfoil during tip rubs.

11. A method according to claim 10 wherein the tip-rake profile is incorporated on the airfoil by machining.

12. A method for assembling a rotor assembly, said method comprising the steps of:
providing a rotor blade including a first sidewall, a second sidewall, where the first and second sidewalls are connected at a leading edge and a trailing edge that are separated from each other in a chord-wise direction of the blade and the first and second sidewalls extend in span from a root portion to a tip portion of the blade;
removing blade material from a portion of the tip portion to form a tip-cutter having a tip-cutter profile that comprises an arcuate portion on the leading edge and a flat portion on the leading edge between the arcuate portion and the tip portion of the airfoil, the arcuate portion defining a recess in the leading edge that extends in the chord-wise direction toward the trailing edge of the airfoil, the flat portion defining a cutter-angle with the leading edge that extends in the chord-wise direction toward the trailing edge of the airfoil; and
coupling the rotor blade to a rotor hub such that during tip rubs the tip-cutter machines an abradable material to facilitate reducing radial loading induced to the blade during tip rubs.

13. A method according to claim 12 wherein the removing step comprises forming the cutter-angle to be an angle of two to five degrees.

14. A method according to claim 12 wherein the removing step comprises forming the arcuate and flat portions to be contiguous with each other.

15. A method according to claim 12 further comprising the step of bonding a tip-grinder to the rotor blade.

16. A method according to claim 15 wherein the step of bonding comprises brazing.

17. A method according to claim 12 further comprising forming the airfoil to have a concave edge and a convex edge that are separated from each other at the tip portion, and forming the tip portion to have a tip-rake profile so that the concave edge is closer to the static structure than the convex edge during a tip rub to facilitate reducing loading induced to the blade during tip rubs.

18. A method according to claim 17 wherein the tip-rake profile is incorporated on the rotor blade by machining.

19. A method for assembling a rotor assembly, said method comprising the steps of:
providing a blade assembly including an airfoil and a metal leading edge (MLE) coupled to at least a portion of said airfoil;
removing material from a portion of the MLE to form a tip-cutter having a cutter-profile; and
coupling the blade assembly to a rotor hub such that during tip rubs the tip-cutter machines an abradable material to facilitate reducing radial loading induced to the blade assembly during tip rubs.

20. A method according to claim 19 further comprising the step of providing a tip-grinder located on a tip portion of the blade assembly, said tip-grinder capable of removing a portion of an abradable material during a tip rub.

21. A method according to claim 19 further comprising the step of providing a tip-rake located on at least a part of a tip portion of the blade assembly, said tip-rake having a rake-profile that facilitates reducing loading induced in the blade assembly during a tip rub.

* * * * *